Sept. 29, 1964     F. R. ARENS     3,150,524

ADJUSTABLE SCALE FOR MANOMETER

Filed Feb. 20, 1961

INVENTOR.
FRED R. ARENS
BY
Flam and Flam
ATTORNEYS.

United States Patent Office 3,150,524
Patented Sept. 29, 1964

3,150,524
ADJUSTABLE SCALE FOR MANOMETER
Fred R. Arens, Chicago, Ill., assignor to General Controls Co., Glendale, Calif., a corporation of California
Filed Feb. 20, 1961, Ser. No. 90,540
1 Claim. (Cl. 73—401)

This invention relates to a manometer.

The primary object of this invention is to provide an improved manometer in which it is possible to view both the scale and the indicating fluid from various angles.

Another object of this invention is to provide an improved manometer characterized by the provision of a scale in the form of a transparent tube surrounding the tube containing the indicating fluid. The scale has markings extending circularly about the indicating fluid to provide a means whereby a reading can be made from various angles. Diametrically opposite portions of a single scale marking serves as a means for ensuring that the line of sight is normal to the top of the indicating fluid, whereby parallax is eliminated.

Still another object of this invention is to provide an improved manometer of this character having simple provisions for adjustment of the scale.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of the invention is best defined by the appended claim.

Referring to the drawings.

Figure 1:
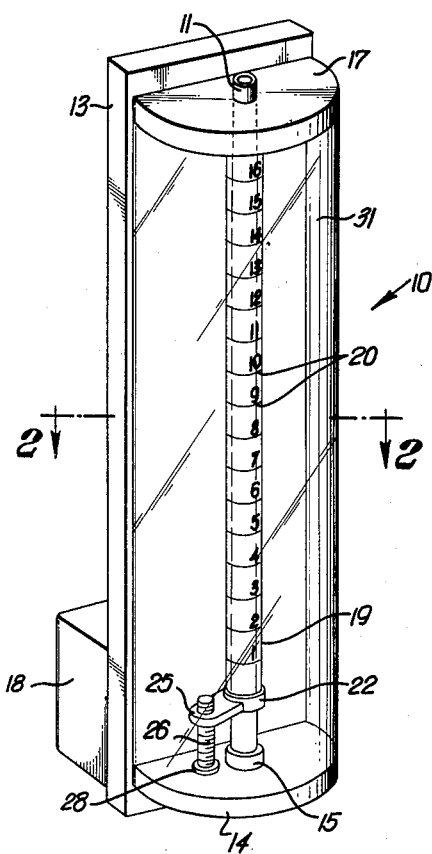
FIGURE 1 is a pictorial view of a manometer incorporating the present invention.
Figure 3:
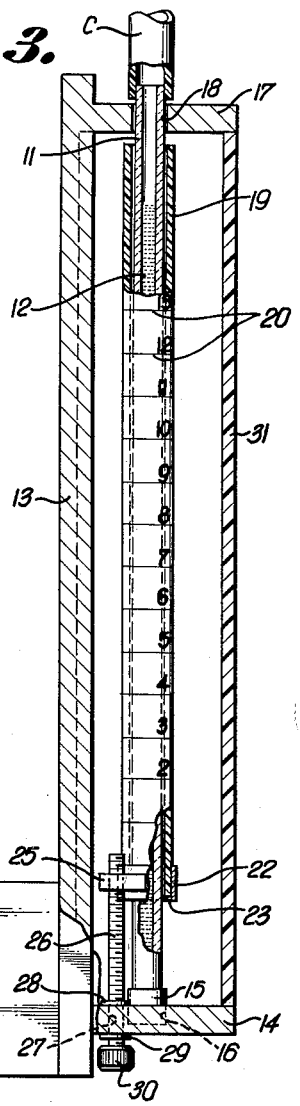
FIG. 3 is a vertical sectional view of the manometer and taken along the offset plane indicated by line 3—3 of FIG. 2.

The manometer 10 includes a glass of other suitable indicating tube 11 in which a column of indicating fluid 12, such as mercury, is contained.

A support 13 is provided for mounting the indicating tube 11. Projecting orthogonally from the support 13 slightly above its lower end is a base wall 14. A resilient sealing sleeve 15 mounted in an upwardly opening recess 16 of the base 14 receives the lower end of the indicating tube 11.

Projecting from the support 13 in spaced juxtaposed relationship to the base 14 is a top wall 17. The upper end of the indicating tube is stabilized by projecting through an aperture 18 in the top 17.

The lower end of the recess 16 communicates with a reservoir 18 mounted on the opposite or rear side of the support 13. Passage means in the base 14 and support 13 (not shown) are provided for establishing suitable communication.

The reservoir 18 is open to atmosphere when the manometer is used to measure vacuum. In that case, the upper end of the tube 11 connects, by the aid of a flexible conduit C, to a device having a negative pressure. Alternately, the reservoir 18 may be subjected to positive pressure, the top of the tube 11 being open. In either case, the height of the mercury column 12 relative to the level in the reservoir 18 provides a measure of the pressure, negative or positive.

Figure 2:
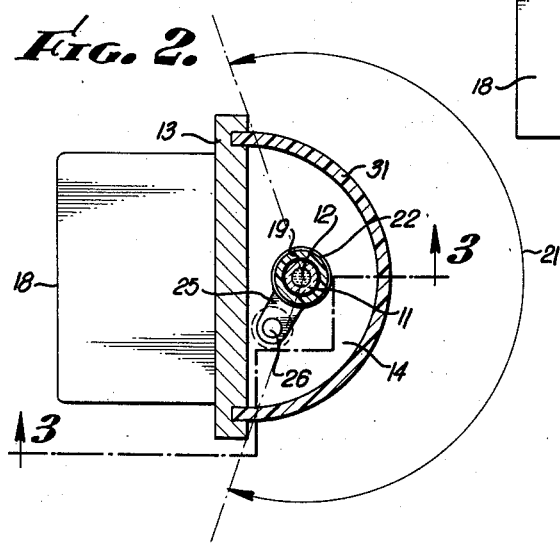
FIG. 2 is a horizontal sectional view taken along a plane corresponding to lines 2—2 of FIG. 1.

In order to provide a means for visually determining the height of the mercury column 12, a scale 19 is provided. The scale 19 is made as a transparent plastic tube relatively closely encompassing the indicating tube 11, the clearance being shown exaggerated. The tubular scale 19 has spaced markings 20 that extend circularly about the tube. Scale markings, in addition to those shown, in practice provide significant readings. The markings may be so spaced as to compensate for the lowering of the level of indicating fluid in the reservoir 18. These scale markings 20 and the column of mercury 12 contained in the indicating tube 11 can be viewed not only frontally, but laterally and throughout an angle generally designated by the double-headed arcuate arrow 21 in FIG. 2. Depending upon the spacing of the support 13 from the axis of the indicating tube 11 and the width of the support, the angle of view can approach 360°.

It is, of course, necessary that the tubular scale 19 be capable of movement relative to the indicating tube 11 in order to bring the zero marking to a position corresponding to the normal level of mercury or indicating fluid contained in the reservoir 18. The tubular scale 19 accordingly has clearance between base 14 and top 17 adequate to allow such movement. Yet the clearance is small enough to maintain a guiding relationship of the tubular scale 19 on the indicating tube 11.

For adjustably supporting the tubular scale 19, an offset bracket is provided. A ring 22 forms a part of the bracket and, like the scale itself, surrounds and clears the indicating tube. The lower end of the scale 19 is fastened within the supporting ring 22. The ring 22 has an inwardly extending flange 23 upon which the lower end of the tubular scale 19 rests.

A bar 25 forms the second part of the bracket. The bar 25 projects laterally of the ring 22 to which it is fastened or with which it is integrally formed. The bar 25, at a place spaced from the ring 22, has a threaded aperture received upon an upstanding lead screw 26. Accordingly, rotation of the lead screw 26 shifts the tubular scale 19 up and down, the bar 25 acting as a lead screw follower. The top of the scale normally clears the top wall 17, but is stopped thereby before the bar aperture reaches the end of the lead screw.

The lead screw 26 is mounted on the base 14. For this purpose, its lower end projects through an aperture 27, and snap rings 28 and 29 on opposite sides of the base locate the lead screw 26 while allowing angular movement. The lower end of lead screw 26 carries a knurled head 30 accessible for manipulation beneath the base 14.

In use, not only is the mercury column 12 and the scale markings 20 visible through the substantial angle 21, but diametrically disposed portions of the scale markings at the top of the indicating fluid, when both in the line of sight, ensure against parallax.

A protective, generally semi-cylindrical, transparent shield 31 fits between the top and bottom walls. Its side edges fit grooves of the support 13.

The inventor claims:

In a measuring instrument of the class described: a support; a base wall and a top wall projecting from one side of the support in spaced juxtaposed relationship; the base wall having a recess; a resilient sealing sleeve in the recess; said top wall having an aperture; an indicating tube having one end fitting the sealing sleeve and the other end projecting through said aperture for detachable connection to a flexible conduit or the like; a transparent tubular scale surrounding the indicating tube with clearance adequate to permit guided movement of said scale; said scale having circularly extending markings thereon; a ring surrounding the indicating tube and supporting the end of the scale adjacent the base; a lead screw mounted on the base for angular movement about an axis parallel to the indicating tube and scale; said lead screw having a head accessible for manipulation; and a bar having a threaded aperture engaging the lead screw and connected to said ring; the top wall being in the path of movement of the scale and limiting its motion to prevent the threaded aperture from leaving the lead screw.

References Cited in the file of this patent

UNITED STATES PATENTS

| | | |
|---|---|---|
| 666,094 | Hicks | Jan. 15, 1901 |
| 1,158,275 | Phillips | Oct. 26, 1915 |
| 1,386,571 | Jackson | Aug. 2, 1921 |
| 1,867,216 | Forney | July 12, 1932 |
| 1,918,635 | Cummings | July 18, 1933 |
| 1,919,630 | Greiner | July 25, 1933 |
| 2,726,549 | Geffen | Dec. 13, 1955 |
| 2,752,785 | Laing | July 3, 1956 |
| 3,023,622 | Hezarifend | Mar. 6, 1962 |

FOREIGN PATENTS

| | | |
|---|---|---|
| 715,648 | Great Britain | Sept. 15, 1954 |

OTHER REFERENCES

Pyrex-Laboratory Glassware (Catalog), TP 868 C78, 1960.